(12) United States Patent
Chang

(10) Patent No.: US 7,345,664 B2
(45) Date of Patent: *Mar. 18, 2008

(54) METHOD AND APPARATUS FOR STEREOSCOPIC DISPLAY EMPLOYING A REFLECTIVE ACTIVE-MATRIX LIQUID CRYSTAL PIXEL ARRAY

(76) Inventor: Sin-Min Chang, 5 Mohegan Rd., Shelton, CT (US) 06484

( * ) Notice: Subject to any disclaimer, the term of this patent is extended or adjusted under 35 U.S.C. 154(b) by 214 days.

This patent is subject to a terminal disclaimer.

(21) Appl. No.: 11/199,875

(22) Filed: Aug. 9, 2005

(65) Prior Publication Data

US 2007/0035493 A1 Feb. 15, 2007

(51) Int. Cl.
G09G 3/36 (2006.01)
(52) U.S. Cl. .................... 345/87; 345/204; 345/207; 345/213
(58) Field of Classification Search .......... 345/87–104, 345/204–215
See application file for complete search history.

(56) References Cited

U.S. PATENT DOCUMENTS

| 4,717,949 | A | 1/1988 | Eichenlaub |
|---|---|---|---|
| 4,829,365 | A | 5/1989 | Eichenlaub |
| 5,036,385 | A | 7/1991 | Eichenlaub |
| 5,675,351 | A | 10/1997 | Kaneko et al. |
| 5,760,827 | A | 6/1998 | Faris |
| 6,016,159 | A | 1/2000 | Farris |
| 6,243,064 | B1 | 6/2001 | Hirakata |
| 6,252,707 | B1 | 6/2001 | Kleinberger et al. |
| 6,424,388 | B1 | 7/2002 | Colgan et al. |
| 6,437,839 | B1 | 8/2002 | Cacharelis |
| 6,456,266 | B1 | 9/2002 | Iba et al. |
| 6,756,954 | B2 | 6/2004 | Yamamoto et al. |
| 2003/0112507 | A1 | 6/2003 | Divelbiss et al. |
| 2003/0234909 | A1 | 12/2003 | Collender et al. |
| 2004/0227706 | A1 | 11/2004 | Sung |

FOREIGN PATENT DOCUMENTS

WO WO 2004/001486 12/2003

OTHER PUBLICATIONS

Kooi F.L, "The Case for Transparent Depth Displays" Report TNO-TM 2001-A067/E, Soesterbert, The Netherlands.
3D Gaming World, "3D Glasses—How They Work", www.3dgw.com/Articles/articlepage.php3?id=1, printed May 12, 2005.
Web Publishers:, "Dan's Data Letters #43" www.dansdata.com/dansletters043.htm, Oct. 23, 2004.

(Continued)

Primary Examiner—Vijay Shankar
(74) Attorney, Agent, or Firm—Gordon & Jacobson, PC

(57) ABSTRACT

An improved stereoscopic display apparatus and methodology includes an array of reflective liquid-crystal-based pixels that are cleared (i.e., placed in a "dark" state) before being loaded with the desired analog voltage potential signals for display during both left perspective image display periods and right perspective image display periods. In this manner, cross-frame image interference between the left and right perspective images is avoided and the quality of the stereoscopic viewing experience is improved. In another aspect, an improved stereoscopic display apparatus and methodology includes a plurality of arrays of reflective liquid-crystal-based pixels. During each successive display period, the pixels of the arrays display an image while being loaded with analog voltage potential signals corresponding to the image to be displayed in the subsequent display period. Such operations avoid cross-frame image interference and expand the left and right perspective image display periods.

26 Claims, 9 Drawing Sheets

OTHER PUBLICATIONS

Brick Bradford, "StereoGraphics Products and Modern Displays", www.stereographics.com/support/lcd-paper.htm, 2000.

3D Display Technology, "How do 3D Displays Work?" www.sharp3d.com/technology/how3ddisplayworks, printed May 12, 2005.

3D Display Technology, "Sharp 3D 'Glasses Free' Display Technology" www.sharp3d.com/technology/howsharp3dworks, printed May 12, 2005.

Andrew J. Woods, "Compatibility of Display Products with Stereoscopic Display Methods" Centre for Marine Science & Technology, Curtin University of Technology, Australia.

Mary Lou Jepsen, 10.3: Rear Projection TV: Single Panel LCOS Lumen Throughout, SID 03 Digest.

Charles L.Bruzzone,James(Jiaying)MA, David J.W.Aastuen, "10.4: High-Performance LCoS Optical Engine Using Cartesian Polarizer Technology", SID 03 Digest.

Couvillion, Roberts, Newell, "KC-135 Boom Operator Training Hi-Fidelity Stereoscopic Display Technology Demonstrator", Interservice/Industry Training,Simultation, &Ed.Conf.2003.

Spatialight Microdisplays, "LCoS Color Methods", www.spatialight.com/Technology/lcos_color_methods.htm, Printed Jul. 14, 2005.

|  | Right Perspective Image Display Periods | | Left Perspective Image Display Periods | |
| --- | --- | --- | --- | --- |
|  | Load $C_s$ / Hold $C_s$ | Drive Pixel with voltage stored on $C^*_s$ | Load $C^*_s$ / Hold $C^*_s$ | Drive Pixel with voltage stored on $C_s$ |
| T1 | ON/OFF | | | OFF |
| T2 | OFF/OFF | | | ON |
| T3 | | ON | OFF/OFF | |
| T4 | | OFF | ON/OFF | |

FIG. 5(B)(i)

|  | Sub-period 2 (L-G)<br>Display L-G from C*s<br>Load L-B into Cs | Sub-period 3 (L-B)<br>Display L-B from Cs<br>Load R-R into C*s |  |
|---|---|---|---|
|  | Sub-period 4 (R-R)<br>Display R-R from C*s<br>Load R-G into Cs | Sub-period 5 (R-G)<br>Display R-G from Cs<br>Load R-B into C*s |  |
|  | Sub-period 6 (R-B)<br>Display R-B from C*s<br>Load L-R into Cs | Sub-period 1 (L-R)<br>Display L-R from Cs<br>Load L-G into C*s |  |
|  | Load $C_s$ / Hold $C_s$ | Drive Pixel with voltage stored on $C^*_s$ | Load $C^*_s$ / Hold $C^*_s$ | Drive Pixel with voltage stored on $C_s$ |
| T1 | ON/OFF |  |  | OFF |
| T2 | OFF/OFF |  |  | ON |
| T3 |  | ON | OFF/OFF |  |
| T4 |  | OFF | ON/OFF |  |

Color Wheel Configuration
    Sub-period 1 (L-R) - Left Perspective Image - Red Color Component
    Sub-period 2 (L-G) - Left Perspective Image - Green Color Component
    Sub-period 3 (L-B) - Left Perspective Image - Blue Color Component
    Sub-period 4 (R-R) - Right Perspective Image - Red Color Component
    Sub-period 5 (R-G) - Right Perspective Image - Green Color Component
    Sub-period 6 (R-B) - Right Perspective Image - Blue Color Component

FIG. 5(D)(ii)

METHOD AND APPARATUS FOR STEREOSCOPIC DISPLAY EMPLOYING A REFLECTIVE ACTIVE-MATRIX LIQUID CRYSTAL PIXEL ARRAY

BACKGROUND OF THE INVENTION

1. Field of the Invention

This invention relates to stereoscopic display methodologies and systems. More particularly, this invention relates to page flipping stereoscopic display methodologies and systems as well as apparatus used therein.

2. State of the Art

Stereoscopic display systems display two perspective images in such a way that each eye of the observer sees only one of the two images. There are many systems in existence that provide this capability through various methods. One of these methods in commonly referred to as "page flipping" or frame-sequential stereo video. In such methods, left and right perspective images are time-division multiplexed and thus displayed during different display periods (i.e., left and right perspective image display periods). Stereoscopic glasses (e.g., shutter-type or polarization-type glasses) are used to ensure that the left perspective images are presented to the left eye during the left perspective image display periods and that the right perspective images are presented to the right eye during the right perspective image display periods.

Autostereoscopic systems have been developed that utilize optics (e.g., lenticular systems, parallax barrier, mirror systems, etc.) to present the left perspective images to the left eye and the right perspective images to the right eye without the need for glasses. Such systems are costly and suffer from various technical problems such as limited depth of field, low brightness, and constrained view regions (i.e., the observer(s) are required to be located in limited viewing area(s) relative to the display). Eastman Kodak has developed an autostereoscopic display system that employs two liquid crystal on silicon (LCOS) spatial light modulators. The LCOS spatial light modulator is a micro-display technology which is related to a transmissive liquid crystal display panels but works differently. The liquid crystal material has a twisted nematic structure like a transmissive liquid crystal display, but it is sealed directly to the surface of a silicon chip. The electronic drivers controlling the crystals' alignment are etched into the silicon. Using these, several million pixels can fit in an area as small as one square inch. The chip is coated with a metal reflecting layer, which means that the LCOS display is highly reflective (rather than transmissive). Color is created in a variety of ways. The simplest approach is to include three LCOS panels, one each for red, green and blue light elements. An alternative approach employs field sequential color techniques (which uses a color wheel and fast electronic switching to separate hues), which enables just one LCOS panel to be used, making the product cheaper. LCOS-based displays are advantageous in that they provide very good resolution, high contrast ratio (typically 1,000:1) and large screen/display at reasonable costs.

The Eastman Kodak system employs the simple 3-panel approach for each one of the two LCOS spatial modulators. One LCOS spatial light modulator provides image formation for the left eye, while the other LCOS spatial light modulator provides image formation for the right eye. A curved mirror and curved diffusers project the left and right images to the pupils of the viewer. The user's eye position is tracked by infrared face imaging. Eye position information is fed to an image generator, which adjusts the rendering viewpoints in both the left and right channels simultaneously. This system is costly as it requires two separate LCOS-based spatial light modulators as well as complex optical components, eye-tracking components and rendering components.

Page flipping stereoscopic display systems are typically realized with a cathode ray tube (CRT) display that is adapted to operate in a progressive scan mode that alternately displays a left perspective image and a right perspective image. Such systems provide adequate performance but are limited by their screen size and weight. With this in mind, users have attempted to employ the prior art page flipping stereoscopic display methodologies to active-matrix liquid-crystal display (LCD) panels. Such panels advantageously provide for increased screen size and significant reductions in weight. However, when used for page flipping stereoscopic viewing, the line-based update mechanisms employed by LCD panels cause significant cross-frame image interference where the pixels from a left perspective image are displayed concurrently with pixels from a right perspective image as shown in FIG. 1. Such interference degrades the image quality and limits the commercial acceptability of page-flipping LCD-based stereoscopic display systems. These limitations are also applicable to page-flipping LCOS-based stereoscopic display systems.

SUMMARY OF THE INVENTION

It is therefore an object of the invention to provide an improved page-flipping stereoscopic display system and methodology that employs an array of reflective liquid-crystal-based pixels (e.g., LCOS pixels) with reduced cross-frame image interference.

It is another object of the invention to provide such a stereoscopic display system and methodology that provides improved image quality and stereoscopic viewing.

In accord with these objects, which will be discussed in detail below, an improved stereoscopic display apparatus and methodology includes at least one array of reflective liquid-crystal-based pixels that are cleared (i.e., placed in a "dark" state) before the pixels are loaded with the desired analog voltage potential signal for display during both left perspective image display periods and right perspective image display periods. In this manner, cross-frame image interference between the left and right perspective images is avoided and the quality of the stereoscopic viewing experience is improved.

In the first embodiment, the display apparatus and methodology are adapted to clear all of the pixels of the at least one reflective array before being loaded with the desired analog voltage potential signal for display during both left perspective image display periods and right perspective image display periods. Such clearing is accomplished by simultaneous activation of all gate lines of the reflective pixel array(s) while supplying voltage potential signals that produce "dark" pixels to all source lines of the reflective pixel array(s).

In the second embodiment, the at least one reflective array includes a reset line for each row of pixels. Each pixel includes a discharge transistor that when activated provides a conduction path that discharges the storage capacitor of the pixel. The reset line for a given row of pixels is electrically coupled to the control electrode of the discharge transistor for each pixel of the given row. The pixels of the reflective array(as) are cleared before the storage capacitors of the pixels are loaded with the desired analog voltage potential signal for display during both left perspective image display periods and right perspective image display periods. Such clearing is accomplished by activating the reset lines for all rows of the reflective array(s). The activation of the reset lines activates the conduction paths provided by the discharge transistors for all the pixels of the reflective array(s).

In another aspect, an improved stereoscopic display apparatus and methodology includes a plurality of arrays of reflective liquid-crystal-based pixels. During each successive display period, the pixels of the arrays display an image while being loaded with analog voltage potential signals corresponding to the image to be displayed in the subsequent display period. Such operations avoid cross-frame image interference and expand the left and right perspective image display periods.

Additional objects and advantages of the invention will become apparent to those skilled in the art upon reference to the detailed description taken in conjunction with the provided figures.

BRIEF DESCRIPTION OF THE DRAWINGS

FIG. 5(B)(i) is a table illustrating the interleaved loading and display operations that are carried out by the column drivers and gate drivers of the reflective active-matrix liquid crystal display apparatus of FIG. 2(A) in accordance with a third embodiment of the present invention.

FIG. 5(B)(ii) is a table illustrating the interleaved loading and display operations that are carried out by the column drivers and gate drivers of the reflective active-matrix liquid crystal display apparatus of FIG. 2(B) in accordance with a third embodiment of the present invention.

DETAILED DESCRIPTION

Figure 2A:
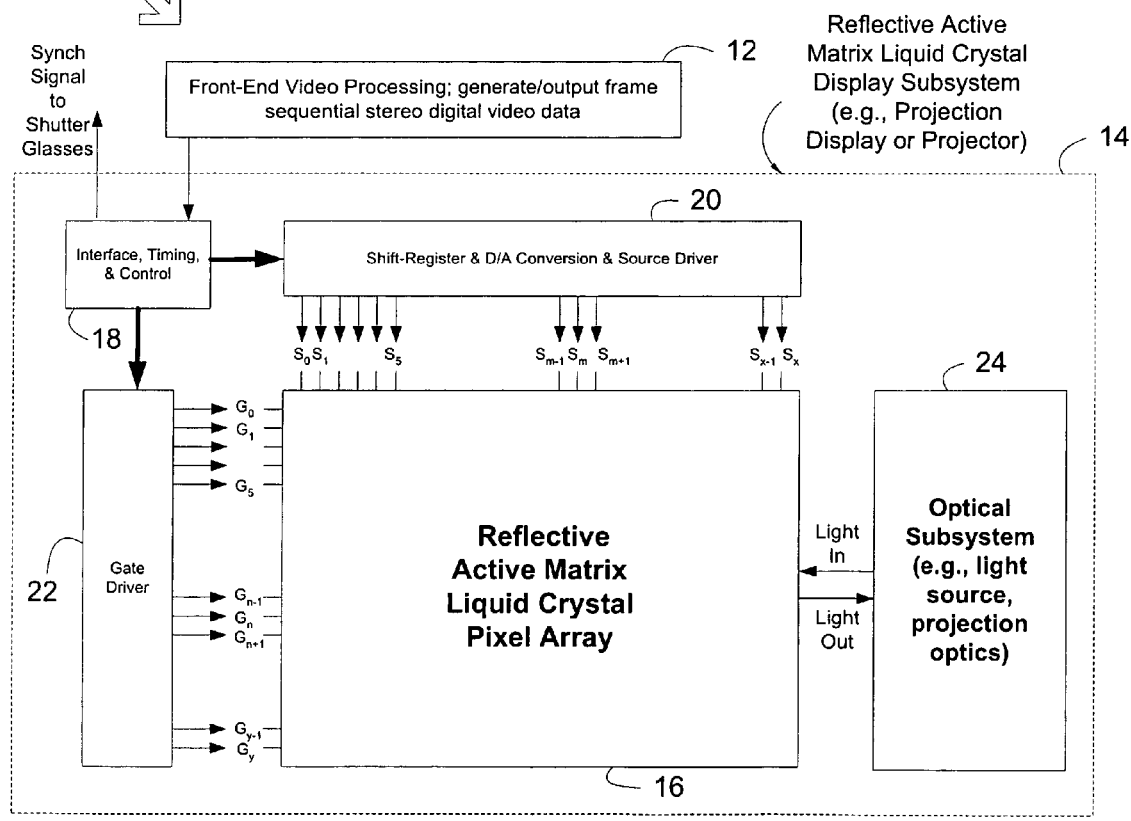
FIGS. 2(A) and 2(B) are functional block diagrams of two exemplary reflective active-matrix liquid crystal display apparatus in which the present invention can be embodied.
Figure 2B:
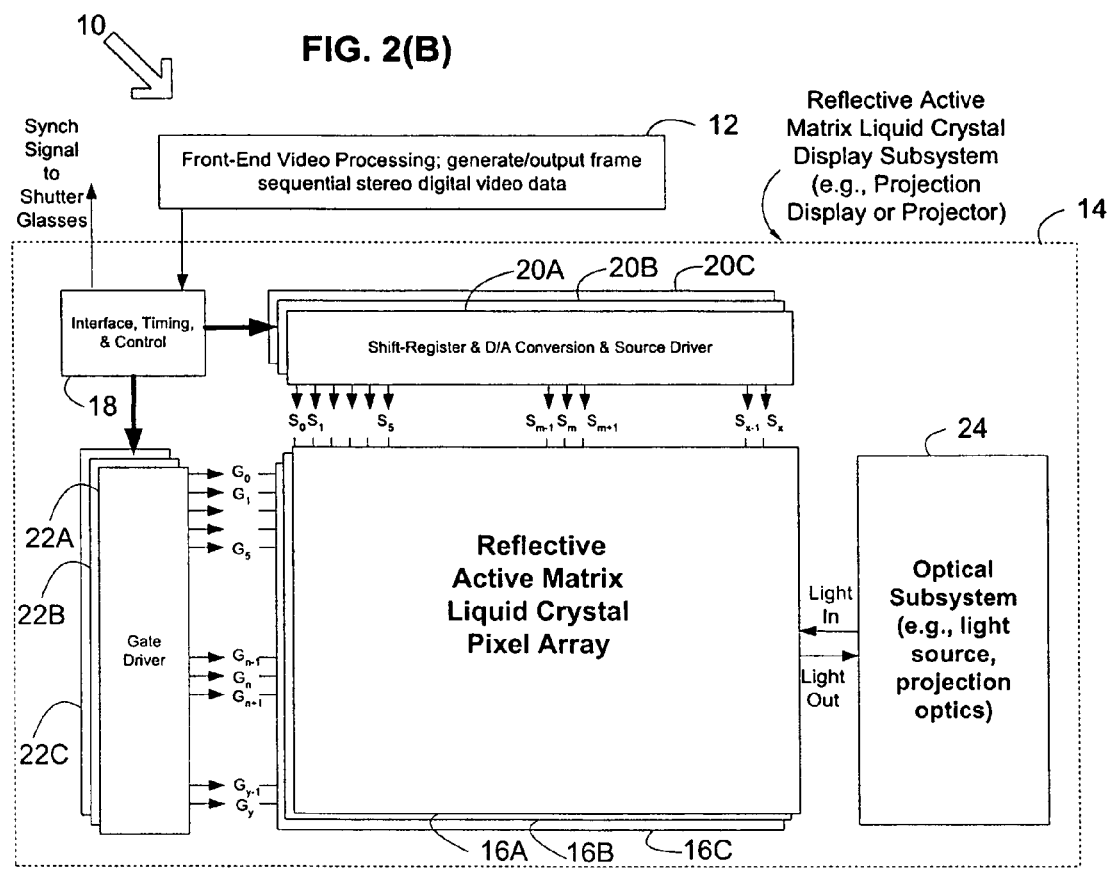

Turning now to FIGS. 2(A) and 2(B), there are shown two functional block diagrams of exemplary stereoscopic reflective active-matrix liquid crystal display (LCD) systems 10 in which the present invention can be embodied, each including a front-end video processor 12 that interfaces to a reflective active-matrix LCD panel display subsystem 14 that includes at least one array 16 of reflective liquid-crystal-based pixels. The video processor 12 generates and outputs a frame sequential stereo video signal that represents a sequence of image pairs that include left and right perspective images (or frames) that are to be displayed on at least one reflective active-matrix liquid crystal pixel array 16. A optical subsystem 24 injects red, green and blue light from the front into the reflective pixels of the array(s) 16 and directs the red, green and blue light reflected by the reflective pixels of the array(s) 16 to a display surface (e.g., a display screen) for viewing by the observer(s). The display surface may be primarily transmissive so that the display image is transmitted therethrough toward one or more viewers, as in a rear projection display, or the display surface may be primarily reflective so that the display image is reflected toward one or more viewers, as in a front projector.

In the architecture of FIG. 2(A), a single reflective active-matrix pixel array 16 is used. Red, green and blue light is presented to the reflective pixel array 16 in a successive temporal sequence. In such a single pixel array architecture, the optical subsystem 24 includes:

a) a light source;
b) optical components that present the red, green and blue light in a successive temporal sequence onto the reflective pixel array;
c) optical components that direct the modulated light reflected from the reflective active-matrix pixel array for output; and
d) a projection lens which receives the modulated light reflected from the reflective active-matrix pixel array and directed thereto and projects such modulated light onto a display surface (e.g., a display screen) for viewing by the observer(s).

A color wheel can be used to present the red, green and blue light to the reflective pixel array. The red, green, and blue light components are typically produced by color separation filters. Drive circuitry (e.g., column driver 20 and the gate driver 22) loads and holds analog voltage potential signals into the reflective pixels of the array in synchronization with the presentation of the red, green and blue light components, which is dictated by the position of the color wheel. The light components being projected onto the reflective pixel array and the analog voltage signals loaded into the reflective pixel array are updated at a high rate (e.g., 3 to 4 times the normal rate for the three pixel array configuration of FIG. 2(B)) such that the observer's eye perceives the red, green and blue sequentially projected images to be a single full color image.

In the architecture of FIG. 2(B), three reflective active-matrix pixel arrays 16A, 16B, 16C are used. Reflective pixel array 16A processes red light. Reflective pixel array 16B processes blue light. Reflective pixel array 16C processes green light. In such a three pixel array architecture, the optical subsystem 24 includes:

a) a light source;
b) optical components that i) separate the light generated by the light source into individual red, green, blue components, ii) direct the individual red, green and blue components to the respective reflective active-matrix pixel arrays 16A, 16B, 16C, and iii) direct the red, green and blue modulated light reflected from the respective reflective active-matrix pixel arrays 16A, 16B, 16C for output;
c) an optical combiner which combines the red, green and blue modulated light output by the optical components to form a composite output beam; and
d) a projection lens which projects the composite output beam generated by the optical combiner onto a display surface (e.g., a display screen) for viewing by the observer(s).

In the preferred embodiment, the left and right frames of the frame sequential digital video signal are formatted in accordance with the 24-bit RGBHVC (red, green, blue, horizontal sync, vertical sync, pixel clock) digital format. Other digital video formats can be used. The front-end video processor 12 can be realized as part of the graphics engine of a personal computer, a set-top box that receives cable-based or satellite-based television signals, a video player (such as a DVD player), a dedicated 3D gaming machine, or other suitable audio/video component.

The display 14 includes an interface block 18 that receives the frame sequential digital video signal communicated from the video processor 12. In the preferred embodiment, the frame sequential digital video signal is communicated from the video processor 12 to the interface block 18 over a serial communication channel that employs low-voltage differential signaling (LVDS). In this configuration, the interface block 18 includes LVDS interface circuitry and a de-serializer. The interface block 18 recovers the red, green and blue pixel data encoded in the frame sequential digital video signal, possibly re-scales such pixel data, and forwards the red, green and blue pixel data to column driver(s) 20. It also includes a timing signal generator and control circuit that generates a pixel clock as well as other timing control signals that are supplied to the column driver(s) 20 and gate driver(s) 22 as is well known.

In the single pixel array architecture of FIG. 2(A), there is a single column driver 20 and a single gate driver 22. The gate driver 22 and the column driver 20 cooperate to load the reflective pixels of the array 16 with the appropriate analog voltage levels (which correspond to the red, green and blue pixel data supplied to the column driver 20) and hold such voltage levels for a predetermined time period (which corresponds to the duration of the active frame). To perform this function, the column driver 20 preferably includes shift registers and digital-to-analog converters that generate analog voltage levels which correspond to the red, green and blue pixel data supplied thereto as well as source drivers that supply such analog voltage levels to the respective source lines $S_0, S_1, \ldots S_x$ of the pixel array 16. The polarity of the analog voltage levels preferably conform to an inversion scheme (e.g., pixel dot inversion, sub-pixel dot inversion) in order to prevent polarization of the liquid crystal material and reduce flicker. The gate driver 22 includes addressing logic and drivers that selectively activate and deactivate the gate lines $G_0, G_1, \ldots G_y$ of the pixel array 16. When the gate driver 22 activates a gate line (for example, gate line $G_0$) for a given row of the array 16, the voltage levels supplied by the column driver 20 on the source lines $S_0, S_1, \ldots S_x$ of the array 16 are loaded into the pixels of the given row (e.g., the row corresponding to gate line $G_0$). The gate driver 22 and the column driver 20 sequentially load and hold the voltage levels into the pixels of the array on a row-by-row basis in synchronization with the red, green and blue light components being sequentially projected thereto. More particularly, the gate driver 22 and the column driver 20 derive analog voltage levels corresponding to red pixel data supplied thereto, and sequentially load and hold such analog voltage levels into the pixels of the array on a row-by-row basis in synchronization with the red light component being projected onto the reflective pixel array. The gate driver 22 and the column driver 20 also derive analog voltage levels corresponding to green pixel data supplied thereto, and sequential load and hold such analog voltage levels into the pixels of the array on a row-by-row basis in synchronization with the green light component being projected onto the reflective pixel array. Similarly, the gate driver 22 and the column driver 20 derive analog voltage levels corresponding to blue pixel data supplied thereto, and sequential load and hold such analog voltage levels into the pixels of the array on a row-by-row basis in synchronization with the blue light component being projected onto the reflective pixel array. The light component being projected onto the reflective pixel array as well as the analog voltage signals loaded into the reflective pixel array for the respective light component are updated at a high rate (e.g., 3 to 4 times the normal rate for the three pixel array configuration of FIG. 2(B)) such that the observer's eyes perceive the red, green and blue sequentially-projected images to be a single full color image. In this architecture, the left and right perspective image display periods described herein each comprise three sequential sub-periods wherein the respective red, green and blue images are projected from the reflective pixel array to produce the corresponding full color perspective image.

In the three pixel array architecture of FIG. 2(B), three pairs of column drivers and gate drivers are used. Column driver 20A and gate driver 22A interface to the reflective array 16A. Column driver 20B and gate driver 22B interface to the reflective array 16B. Column driver 20C and gate driver 22C interface to the reflective array 16C. In this architecture, the interface block 18 forwards the red pixel data to the column driver 20A, the blue pixel data to column driver 20B and the green pixel data to column driver 20C. Each respective column driver and gate driver pair cooperates to load the active pixels of the corresponding reflective pixel array with the appropriate analog voltage levels (which correspond to the red, green or blue pixel data supplied to the respective column driver) and hold such voltage levels for a predetermined time period (which corresponds to the duration of the active frame). To perform this function, the column drivers 20A, 20B, 20C each preferably include shift registers and digital-to-analog converters that generate analog voltage levels which correspond to the red, green or blue pixel data supplied thereto as well as source drivers that supply such analog voltage levels to the respective source lines $S_0, S_1, \ldots S_x$ of the corresponding pixel array. The polarity of the analog voltage levels preferably conform to an inversion scheme (e.g., pixel dot inversion, sub-pixel dot inversion) in order to prevent polarization of the liquid crystal material and reduce flicker. The gate drivers 22A, 22B, 22C each preferably include addressing logic and drivers that selectively activate and deactivate the gate lines $G_0, G_1, \ldots G_y$ of the corresponding pixel array. When the gate driver activates a gate line (for example, gate line $G_0$) for a given row of the corresponding array, the voltage levels supplied by the column driver on the source lines $S_0, S_1, \ldots S_x$ of the corresponding array are loaded into the pixels of the given row (e.g., the row corresponding to gate line $G_0$).

Figure 3A:
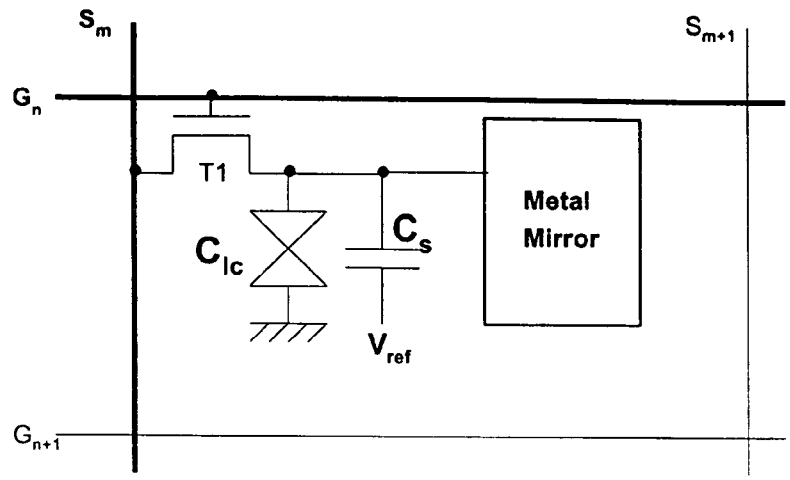
FIG. 3(A) is a schematic diagram of an exemplary active pixel structure for the pixels of the reflective array(s) of FIGS. 2(A) and 2(B).

A schematic diagram of an exemplary active pixel structure is shown in FIG. 3(A). In this structure, the pixel has a storage capacitor $C_s$, a source line $S_m$ (which is coupled to the pixels of the column m of the array), and a gate line $G_n$ (which is coupled to the pixels of the row n of the array). The source line $S_m$ for the pixel is selectively coupled to both the first plate of a storage capacitor $C_s$ and the reflective bottom mirror/electrode of the liquid crystal cell (denoted by its parasitic capacitance $C_{lc}$) by the current path of a thin-film transistor T1. The second plate of the storage capacitor $C_s$ is coupled to a reference voltage (e.g., ground potential as shown). The transparent top electrode of the liquid crystal cell is also coupled to a reference voltage (e.g., $V_{ref}$ as shown). The gate line $G_n$ for the pixel is coupled to the control electrode (gate) of the transistor T1. The voltage potential stored on the storage capacitor $C_s$ provides a voltage difference between the bottom and top pixel electrodes, which controls the orientation of the LC material therebetween. Such control over the orientation of the LC material of the cell provides control over the polarization state of the light emitted therefrom after reflection from the reflecting metal of the bottom pixel electrode and is used as part of a light valve to control the gray level light intensity for the pixel. The active pixel elements and the reflective bottom electrodes of the pixels are preferably integrated on a silicon substrate. The top electrodes of the pixels are preferably integrated on an opposing transparent glass substrate. Liquid crystal material is disposed between these two substrates to realize the reflective liquid crystal cells of the pixel array.

During a loading operation, the gate driver activates the gate line $G_n$, which causes the current path of transistor T1 to be activated. The column driver presents the desired voltage potential signal onto the source line $S_m$, where it is loaded into the storage capacitor $C_s$ by the activated current path of transistor T1. The gate driver then de-activates the gate line $G_n$, which causes the current path of transistor T1 to be de-activated and thus isolates the storage capacitor $C_s$ and the liquid crystal cell from the source line $S_m$. During this time period (which is referred to as the hold period), the charge stored by storage capacitor maintains the application of the desired voltage potential signal on the liquid crystal cell. This holding condition continues for the duration of the active red, green or blue sub-period for the architecture of FIG. 2(A) or for the duration of the active frame for the architecture of FIG. 2(B). These loading and holding operations are performed for each row of the pixel array. After the duration of the current display sub-period or frame has expired, these loading and holding operations are performed over the rows of the pixel array for the next display sub-period for the architecture of FIG. 2(A) or for the next frame for the architecture of FIG. 2(B).

Figure 1:
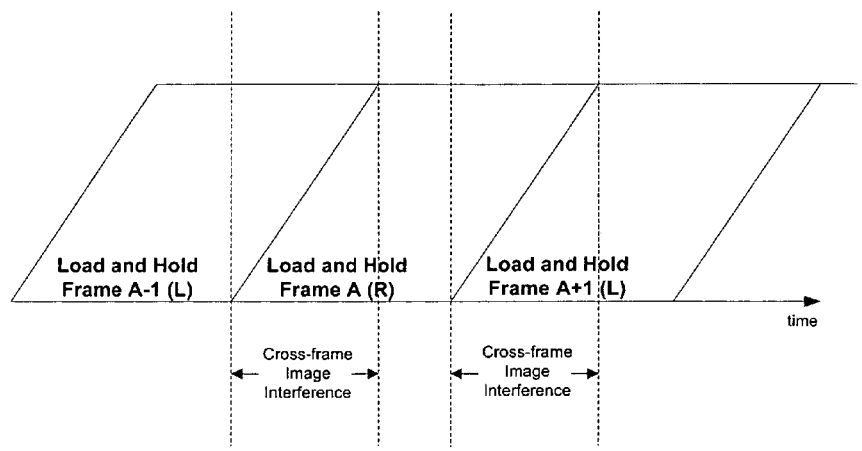
FIG. 1 is a schematic diagram illustrating the load and hold operations of a prior art active-matrix liquid crystal display apparatus in displaying a frame-sequential stereo video signal.

In accordance with the present invention, the column driver(s) and the gate driver(s) of the display subsystem 14 are adapted such that the reflective pixels of the corresponding array are cleared (i.e., placed in a "dark" state) before the pixels are loaded with the desired analog voltage potential signals for display during both left perspective image display periods and right perspective image display periods. In this manner, cross-frame image interference between the left and right perspective images (FIG. 1) is avoided and the quality of the stereoscopic viewing experience is improved.

Figure 3B:
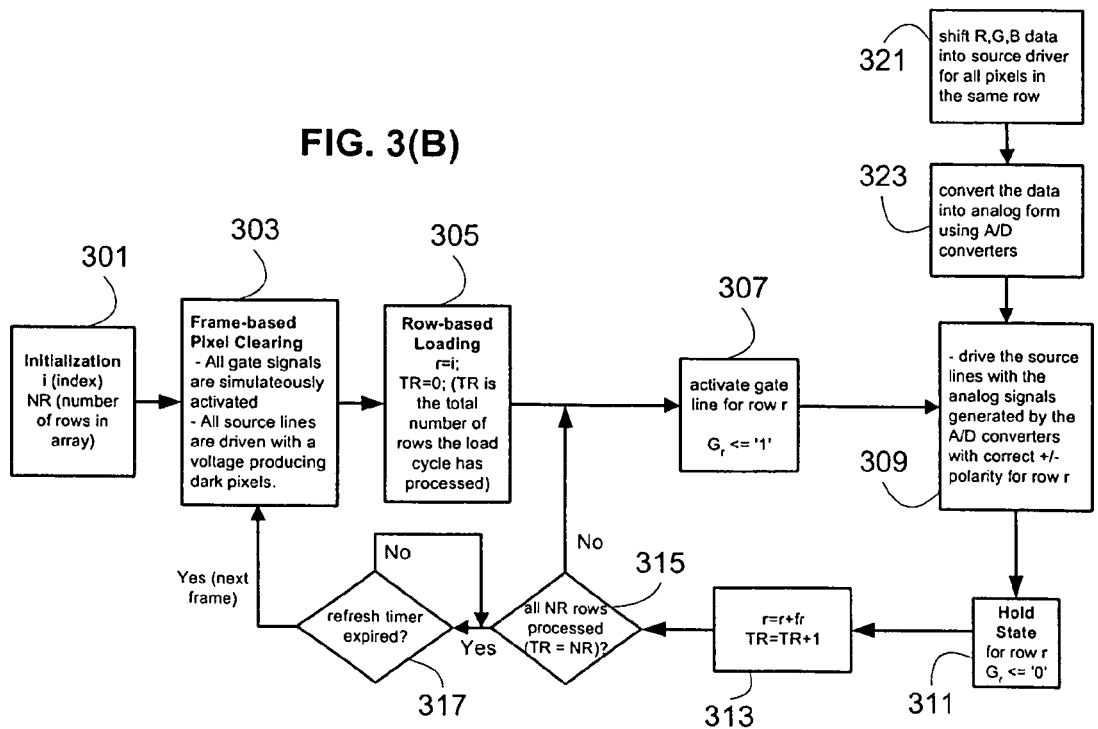
FIG. 3(B) is a flow chart illustrating the frame-based pixel clearing operations and row-based load and hold operations that are carried out by the column driver(s) and gate driver(s) of the reflective active-matrix liquid crystal display apparatus of FIGS. 2(A) and 2(B) in accordance with a first embodiment of the present invention.
Figure 3C:
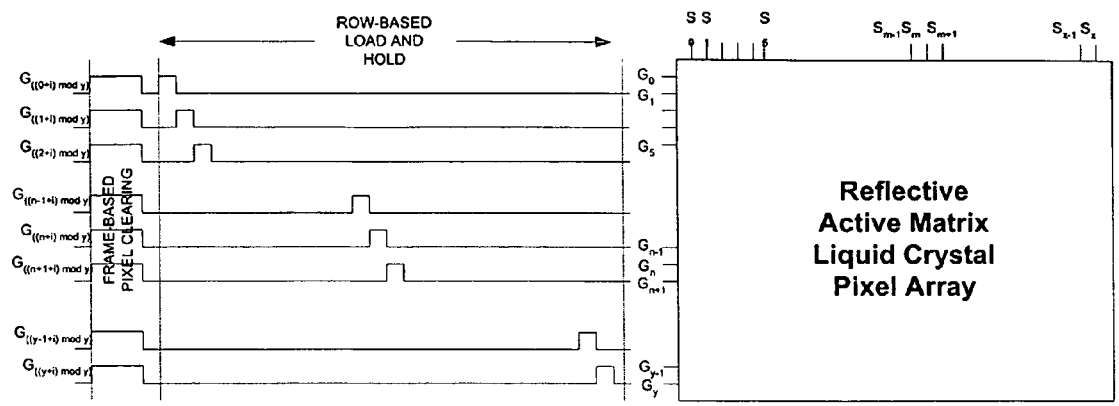
FIG. 3(C) is a schematic diagram that illustrates the operation of the gate driver(s) of FIGS. 2(A) and 2(B) in activating and de-activating the gate lines of the reflective pixel array(s) as part of the pixel clearing operations and the load and hold operations of FIG. 3(B).
Figure 3C:
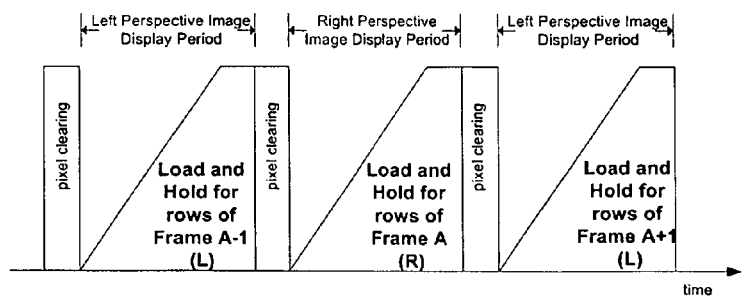
Figure 3D:
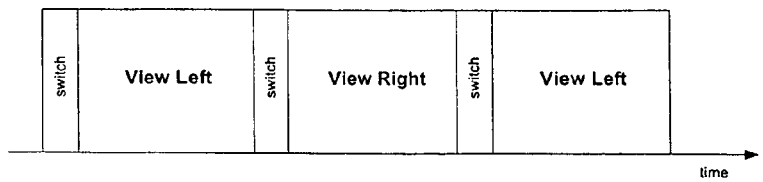
FIGS. 3(D)(i) and (ii) are schematic diagrams that illustrate the temporal relationship of the pixel clearing operations and load and hold operations of FIG. 3(B) with the operation of shutter glasses, respectively.

FIGS. 3(B), 3(C), 3(D)(i) and 3D(ii) illustrate a first embodiment of the present invention whereby the column driver(s) and the gate driver(s) are adapted to perform a frame-based pixel clearing operation. As depicted in the flow chart of FIG. 3(B), the operations begin in block 301 by initializing an index i (which refers to the starting row number in each frame) and a variable NR (which refers to the total number of rows in the array and in each frame). In block 303, a frame-based pixel clearing operations is performed wherein the gate driver simultaneously activates all of the gate line $G_0, G_1, \ldots G_y$ of its corresponding reflective pixel array ($G_0<='1', G_1,='1', \ldots G_y<='1'$) and the column driver drives all of the source lines $S_0, S_1, \ldots S_x$ of its corresponding reflective pixel array with a voltage potential that produces "dark" pixels. In blocks 305-315, row-based loading and holding operations are performed over the rows of the corresponding pixel array for the current frame. In block 305, a counter r (which refers to the current row) is set to the index i, and a counter TR (which refers to the total number of rows processed in the loop of blocks 305-315) is initialized to '0'. In block 307, the gate driver activates the gate line $G_r$ for the row r ($G_r<='1'$). In block 309, the column driver drives the source lines $S_0, S_1, \ldots S_x$ of the corresponding reflective pixel array with the analog voltage levels and polarities in accordance with the red, green and/or blue pixel data corresponding to the pixels of the row. Such data is shifted into the column driver in block 321 and converted from digital to analog form in block 323. As a result of blocks 307 and 309, for each given pixel in the row r, the current path of the T1 transistor is activated for the given pixel and the desired voltage potential signal is loaded into the storage capacitor $C_s$ of the given pixel by the activated current path of the T1 transistor. In block 311, the gate driver de-activates the gate line $G_r$ for the row r ($G_r<='0'$), which causes the current path of the T1 transistor to be de-activated for each pixel in row r and thus isolates the storage capacitors and the liquid crystal cells of the pixels in row r from their corresponding source lines. In this condition, the charge stored by the respective storage capacitors maintains the application of the desired voltage potential signal on the corresponding liquid crystal cell. This holding condition continues for the duration of the active red, green or blue sub-period for the architecture of FIG. 2(A) or for the duration of the active frame for the architecture of FIG. 2(B). In block 313, the current row counter r is updated by a function fr and the counter TR is incremented by 1. The initialization of the row counter r and the function fr are preferably adapted to provide smooth and balanced illumination distributed over the rows of the reflective pixel array(s). In block 315, it is determined if all of the rows of the corresponding array have been processed (i.e., TR=NR). If not, the operation returns to blocks 307-313 to load and hold the next row of pixels. If so, the operations continue to block 317 to wait for a refresh timer to expire. Such expiration marks the end of active display operations for the current red, green or blue sub-period in the architecture of FIG. 2(A) or the end of the active display operations for the current frame in the architecture of FIG. 2(B). Upon expiration of the refresh timer, the operations return to blocks 303-315 to perform the frame-based pixel clearing operations and row-based load and hold operations for the pixels in the next display sub-period in the architecture of FIG. 2(A) or for the pixels in the next frame in the architecture of FIG. 2(B). The load and hold operations for the pixels of each frame alternate between operations that display a left perspective image in a left perspective image display period and operations that display a right perspective image in a right perspective image display period (FIG. 3(D)(i)). During the left perspective image display period, the analog voltage potential signals loaded into the pixels of the reflective pixel array(s) are derived from the red, green and blue pixel data of the corresponding left perspective image data that is received by the column driver(s). During the right perspective image display period, the analog voltage potential signals loaded into the pixels of the reflective pixel array(s) are derived from the red, green and blue pixel data of the corresponding right perspective image data that is received by the column driver(s).

FIG. 3(C) illustrates the operation of the gate driver in activating and de-activating the gate lines the corresponding reflective pixel array as part of the frame-based pixel clearing operations and the row-based load and hold operations of FIG. 3(B).

FIGS. 3(D)(i) and (ii) illustrate the temporal relationship of the pixel clearing operations and load and hold operations of FIG. 3(B) with the operation of shutter glasses, respectively. Such operations provide for improved stereoscopic viewing. As shown in FIG. 3(D)(ii), the shutter glasses are controlled to alternate between a "view left" mode and a "view right" mode. In the "view left" mode, the displayed image passes through the left lens of the glasses to the left eye, but is blocked by the right lens of the glasses. In the "view right" mode, the displayed image passes through the right lens of the glasses to the right eye, but is blocked by the left lens of the glasses. The switching of the glasses between the "view left" mode and the "view right mode", which preferably occurs during the frame-based pixel clearing operations of the display as shown, is synchronized to the corresponding left and right perspective image display periods of the display by a synchronization signal communicated from the interface block 18 to the shutter glasses (FIG. 2). The synchronization signal may be communicated from the interface block 18 to the shutter glasses over a wired or wireless communication link therebetween.

FIGS. 4(A), 4(B), 4(C), 4(D)(i) and 4D(ii) illustrate a second embodiment of the present invention whereby the active pixel structure, the column driver(s) and the gate driver(s) of the display subsystem 14 are adapted to perform pixel clearing operations utilizing reset lines that are each coupled to a row of pixels in the corresponding reflective pixel array. In this second embodiment, the gate driver(s) and the column driver(s) are adapted such that the pixels of the corresponding reflective pixel array are cleared (i.e., placed in a "dark" state) before the pixels are loaded with the desired analog voltage potential signals. In this manner, cross-frame image interference (FIG. 1) is avoided.

Figure 4A:
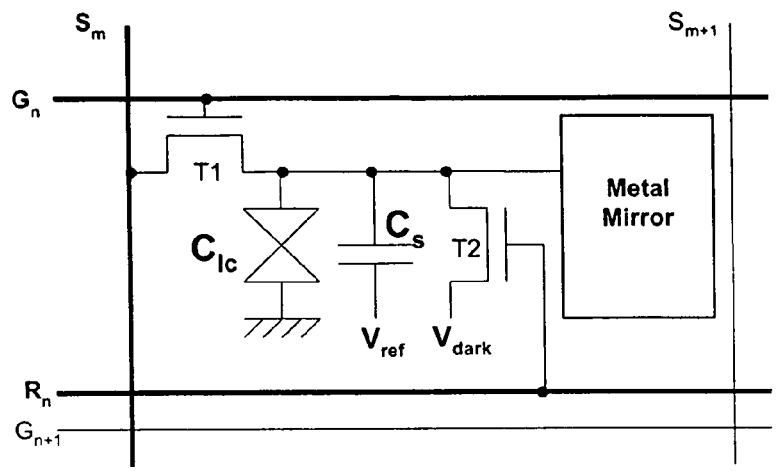
FIG. 4(A) is a schematic diagram of an alternate active pixel structure for the pixels of the reflective array(s) of FIGS. 2(A) and 2(B).

FIG. 4(A) illustrates an alternate active pixel structure in accordance with the present invention. In this structure, the pixel has a storage capacitor $C_s$, a source line $S_m$ (which is coupled to the pixels of the column m of the array), and a gate line $G_n$ and reset line $R_n$ (which are coupled to the pixels of the row n of the array). The source line $S_m$ for the pixel is selectively coupled to both the first plate of a storage capacitor $C_s$ and the reflective bottom mirror/electrode of the liquid crystal cell (denoted by its parasitic capacitance $C_{lc}$) by the current path of a thin-film transistor T1. The transparent top electrode of the liquid crystal cell is coupled to a reference voltage (e.g., ground potential as shown). The second plate of the storage capacitor $C_s$ is also coupled to a reference voltage (e.g., $V_{ref}$ as shown). The gate line $G_n$ for the pixel is coupled to the control electrode (gate) of the transistor T1. A reset line $R_n$ for the pixel is coupled to the control electrode (gate) of the transistor T2. The current path of the transistor T2 selectively couples the first plate of the storage capacitor $C_s$ to a voltage reference (e.g., $V_{dark}$ as shown). The voltage potential stored on the storage capacitor $C_s$ provides a voltage difference between the bottom and top pixel electrodes, which controls the orientation of the LC material therebetween. Such control over the orientation of the LC material of the cell provides control over the polarization state of the light emitted therefrom after reflection from the reflecting metal of the bottom pixel electrode and is used as part of a light valve to control the gray level light intensity for the pixel. The active pixel elements and the reflective bottom electrodes of the pixels are preferably integrated on a silicon substrate. The top electrodes of the pixels are preferably integrated on an opposing transparent glass substrate. Liquid crystal material is disposed between these two substrates to realize the reflective liquid crystal cells of the array.

During a reset operation, the gate driver activates the reset line $R_n$, which causes the current path of transistor T2 to be activated. The gate driver also drives the gate line for the current row ($G_n$) at an "off" level (e.g., $G_n<='0'$). This clears any charge stored on the storage capacitor $C_s$ through the activated current path of transistor T2 and thus applies a null voltage signal to the liquid crystal cell, thereby producing a "dark" pixel. After the reset operation is complete, the gate driver de-activates the reset line $R_n$, which causes the current path of transistor T2 to be de-activated.

During load and hold operations, the gate driver activates the gate line $G_n$, which causes the current path of transistor T1 to be activated. The column driver presents the desired voltage potential signal onto the source line $S_m$, where it is loaded onto the storage capacitor $C_s$ by the activated current path of transistor T1. The gate driver then de-activates the gate line $G_n$, which causes the current path of transistor T1 to be de-activated and thus isolates the storage capacitor $C_s$ and the liquid crystal cell from the source line $S_m$. During this time period (which is referred to as the hold period), the charge stored by storage capacitor $C_s$ maintains the application of the desired voltage potential signal on the liquid crystal cell. This holding condition continues for the duration of the active red, green or blue sub-period for the architecture of FIG. 2(A) or for the duration of the active frame for the architecture of FIG. 2(B). The reset line $R_n$ remains inactive for all of these operations.

Figure 4B:
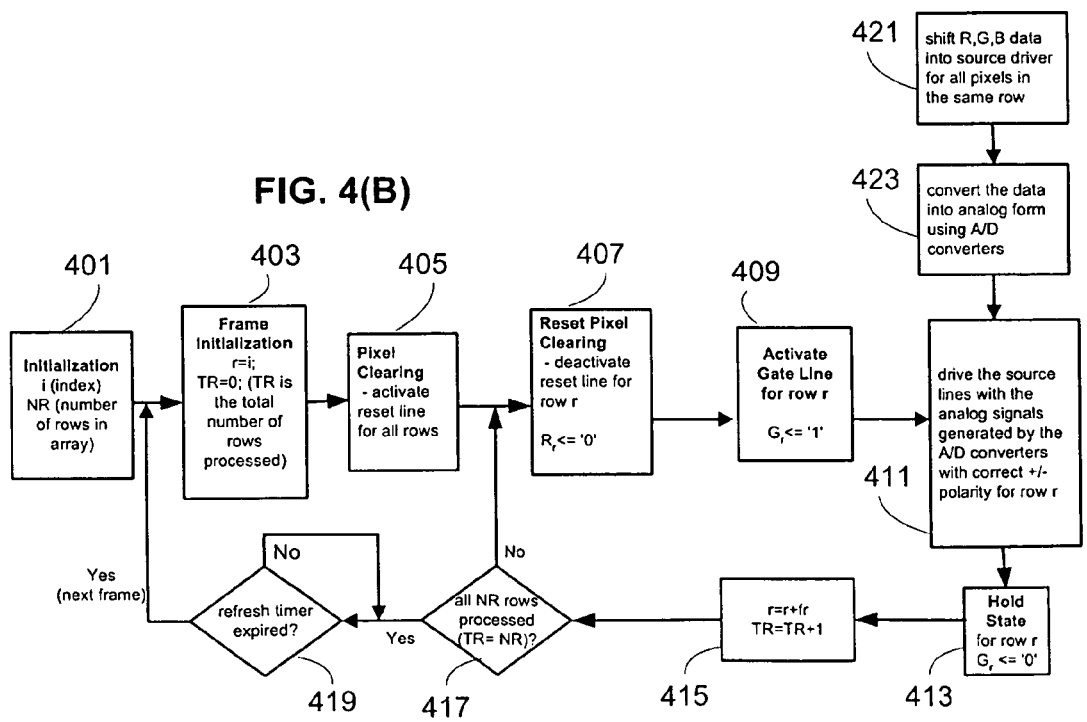
FIG. 4(B) is a flow chart illustrating the pixel clearing operations and load and hold operations that are carried out by the column driver(s) and gate driver(s) of the reflective active-matrix liquid crystal display apparatus of FIGS. 2(A) and 2(B) in accordance with a second embodiment of the present invention.

These pixel clearing operations and load and hold operations are performed for each row of the corresponding reflective pixel array as depicted in the flow chart of FIG. 4(B). The operations begin in block 401 by initializing an index i (which refers to the starting row number in each frame) and a variable NR (which refers to the total number of rows in the corresponding reflective pixel array and in each frame). In block 403, a counter r (which refers to the current row) is set to the index i, and a counter TR (which refers to the total number of rows processed in the loop of blocks 305-315) is initialized to '0'. In block 405, the gate driver simultaneously activates all of the reset line $R_0$, $R_1$, ... $R_y$ of its corresponding reflective pixel array ($R_0<='1'$, $R_1<='1'$, ... $R_y<='1'$). The gate lines $G_0$, $G_1, \ldots G_y$ of its corresponding reflective pixel array are driven at an "off" level ($G_0<='0'$, $G_1<='0'$, ...). This clears any charge stored on the storage capacitors of all the pixels of the corresponding array through the activated current paths of the T2 transistors of the pixels and thus applies a null voltage signal to the liquid crystal cells of the pixels, thereby producing "dark" pixels over the array.

In blocks 407-417, row-based loading and holding operations are performed over the rows of the corresponding reflective pixel array for the current frame. In block 407, the gate driver de-activates the reset line $R_r$ for the current row r ($R_r<='0'$), which causes the current paths of the T2 transistors to be de-activated for the pixels of row r. In block 409, the gate driver activates the gate line $G_r$ for the row r ($G_r<='1'$). In block 411, the column driver drives the source lines $S_0, S_1, \ldots S_x$ of the corresponding array with the analog voltage levels and polarities in accordance with the red, green and/or blue pixel data corresponding to the pixels of the row. Such data is shifted into the column driver in block 421 and converted from digital to analog form in block 423. As a result of blocks 409 and 411, for each given pixel in the row r, the current path of the T1 transistor is activated for the given pixel and the desired voltage potential signal is loaded into the storage capacitor $C_s$ of the given pixel by the activated current path of the T1 transistor. In block 413, the gate driver de-activates the gate line $G_r$ for the row r ($G_r<='0'$), which causes the current path of the T1 transistor to be de-activated for each pixel in row r and thus isolates the storage capacitors and the liquid crystal cells of the pixels in row r from their corresponding source lines. In this condition, the charge stored by the respective storage capacitors maintains the application of the desired voltage potential signal on the corresponding liquid crystal cell. This holding condition continues for the duration of the active red, green or blue sub-period for the architecture of FIG. 2(A) or for the duration of the active frame for the architecture of FIG. 2(B). In block 415, the current row counter r is updated by a function fr and the counter TR is incremented by 1. The initialization of the row counter r and the function fr are preferably adapted to provide smooth and balanced illumination distributed over the rows of the reflective pixel array(s). In block 417, it is determined if all of the rows of the array have been processed (i.e., TR=NR). If not, the operation returns to blocks 407-415 to load and hold the next row of pixels. If so, the operations continue to block 419 to wait for a refresh timer to expire. Such expiration marks the end of the active display operations for the current red, green or blue sub-period in the architecture of FIG. 2(A) or the end of the active display operations for the current frame in the architecture of FIG. 2(B). Upon expiration of the refresh timer, the operations return to blocks 403-417 to perform the pixel clearing operations and row-based load and hold operations for the pixels in the next display sub-period in the architecture of FIG. 2(A) or for the pixels in the next frame in the architecture of FIG. 2(B). The load and hold operations for the pixels of each frame alternate between operations that display a left perspective image in a left perspective image display period and operations that display a right perspective image in a right perspective image display period (FIG. 4(D)(i)). During the left perspective image display period, the analog voltage potential signals loaded into the pixels of the reflective pixel array(s) are derived from the red, green and blue pixel data of the corresponding left perspective image data that is received by the column driver(s). During the right perspective image display period, the analog voltage potential signals loaded into the pixels of the reflective pixel array(s) are derived from the red, green and blue pixel data of the corresponding right perspective image data that is received by the column driver(s).

Figure 4C:
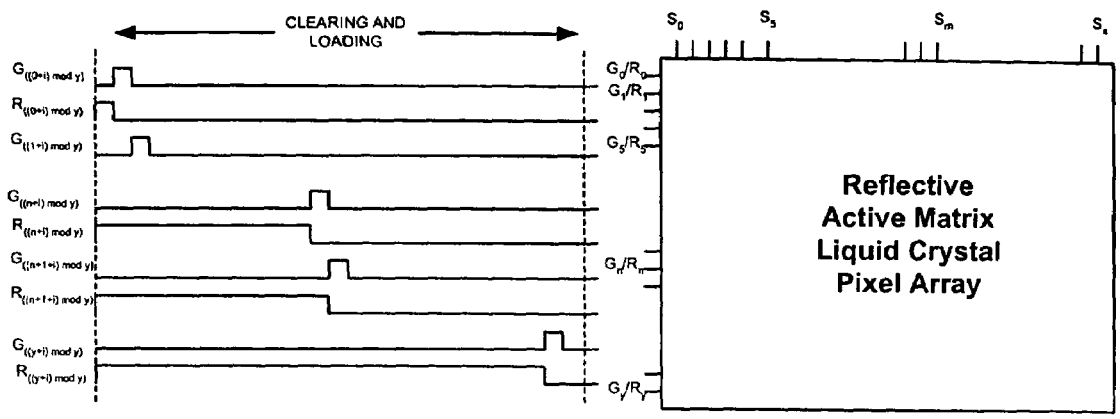
FIG. 4(C) is a schematic diagram that illustrates the operation of the gate driver(s) of FIGS. 2(A) and 2(B) in activating and de-activating the gate lines and reset lines of the reflective pixel array(s) as part of the pixel clearing operations and the load and hold operations of FIG. 4(B).

FIG. 4(C) illustrates the operation of the gate driver in activating and deactivating the gate lines and reset lines of the corresponding reflective array as part of the pixel clearing and load and hold operations of FIG. 4(B).

Figure 4D:
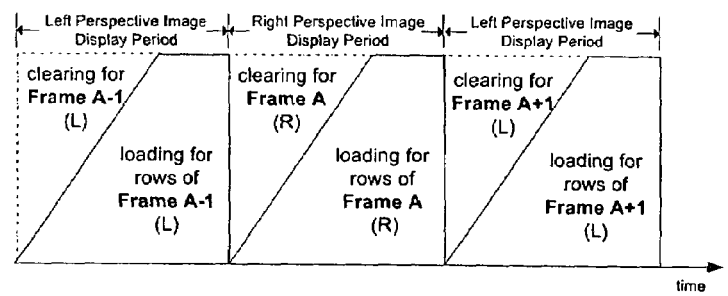
FIGS. 4(D)(i) and (ii) are schematic diagrams that illustrate the temporal relationship of the pixel clearing operations and load and hold operations of FIG. 4(B) with the operation of shutter glasses, respectively.
Figure 4D:
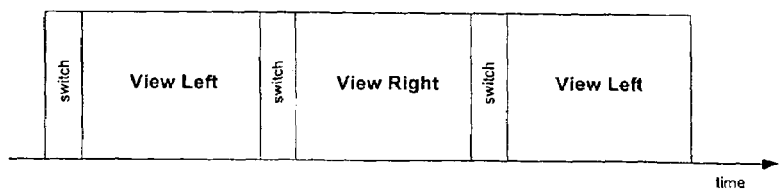

FIGS. 4(D)(i) and (ii) illustrate the temporal relationship of the pixel clearing and load and hold operations of FIG. 4(B) with the operation of shutter glasses, respectively. Such operations provide for improved stereoscopic viewing. As shown in FIG. 4(D)(ii), the shutter glasses are controlled to alternate between a "view left" mode and a "view right" mode. In the "view left" mode, the displayed image passes through the left lens of the glasses to the left eye, but is blocked by the right lens of the glasses. In the "view right" mode, the displayed image passes through the right lens of the glasses to the right eye, but is blocked by the left lens of the glasses. The switching of the glasses between the "view left" mode and the "view right mode", which preferably occurs during the beginning of the pixel clearing and load and hold operations of the display as shown, is synchronized to the corresponding left and right perspective image display periods of the display by a synchronization signal communicated from the interface block 18 to the shutter glasses (FIG. 2). The synchronization signal may be communicated from the interface block 18 to the shutter glasses over a wired or wireless communication link therebetween.

Figure 5A:
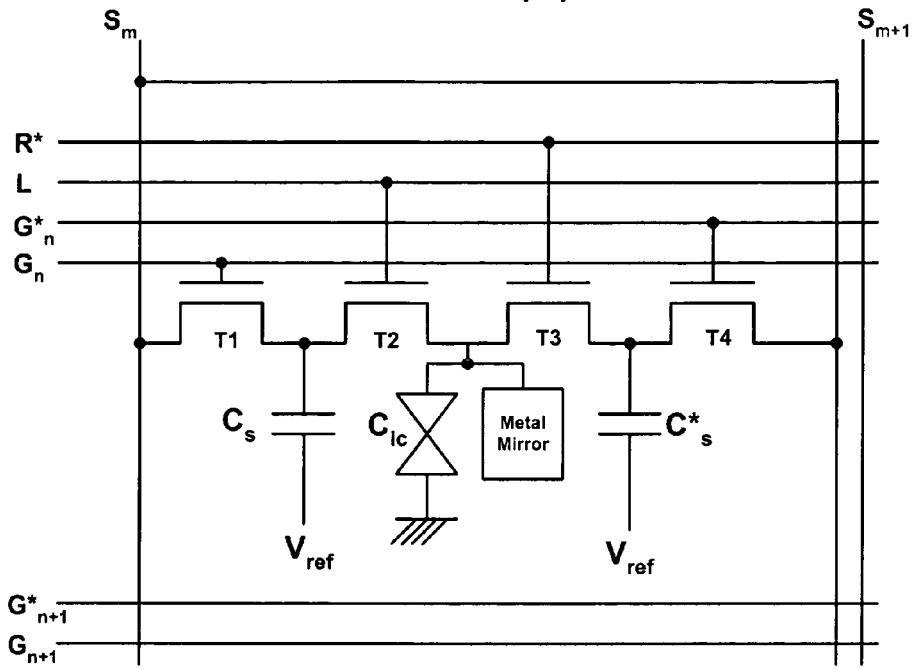
FIG. 5(A) is a schematic diagram of yet another active pixel structure for the pixels of the reflective arrays of FIG. 2(B).

FIGS. 5(A), 5(B)(i), 5(B)(ii), 5(C), 5(D)(i) and 5D(ii) illustrate a third embodiment of the present invention whereby the active pixel structure, the column driver(s) and the gate driver(s) of the reflective active-matrix liquid crystal display subsystem 14 are adapted to perform interleaved pixel loading and display operations.

In the architecture of FIG. 2(A), the pixel loading and display operations are interleaved over successive display sub-periods in the sequential progression of display sub-periods that make up the left and right perspective image display periods. During each given display sub-period, the pixels of the reflective array are loaded with analog voltage potential signals corresponding to a particular color component of a left or right perspective image that is associated (or mapped to) the given display sub-period while displaying the color component of a left or right perspective image that is associated with (or mapped to) the preceding display sub-period.

In the architecture of FIG. 2(B), the pixel loading and display operations are interleaved between the left perspective images and the right perspective images. During right perspective image display periods, the pixels of the reflective arrays 16A, 16B, 16C are loaded with analog voltage potential signals corresponding to a left perspective image while displaying the preceding right perspective image. Likewise, during left perspective image display periods, the pixels of the reflective arrays 16A, 16B, 16C are loaded with analog voltage potential signals corresponding to a right perspective image while displaying the preceding left perspective image.

In both architectures, cross-frame image interference (FIG. 1) is avoided. Moreover, the interleaved pixel loading and display operations avoid time lag between the active display of the color components of the left and right perspective images in the architecture of FIG. 2(A) and avoid the time lag between left and right perspective image in the architecture of FIG. 2(B). Avoiding such time lag provides for expansion of the left and right perspective image display periods and improved stereoscopic viewing quality.

FIG. 5(A) illustrates another active pixel structure in accordance with the present invention. In this structure, the pixel has two storage capacitors $C_s$ and $C^*_s$, a source line $S_m$ (which is coupled to the pixels of the column m of the array), and two gate lines $G_n$ and $G^*_n$ (which are coupled to the pixels of the row n of the array). Two control lines R* and L are coupled to all of the pixels of the array. The source line $S_m$ is selectively coupled to the first plate of storage capacitor $C_s$ by the current path of a thin-film transistor T1. The source line $S_m$ is also selectively coupled to the first plate of storage capacitor $C^*_s$ by the current path of a thin-film transistor T4. The first plate of the storage capacitor $C_s$ is selectively coupled to the reflective bottom mirror/electrode of the liquid crystal cell (denoted by its parasitic capacitance $C_{ls}$) by the current path of a thin-film transistor T2. The first plate of the storage capacitor $C^*_s$ is selectively coupled to the reflective bottom mirror/electrode of the liquid crystal cell by the current path of a thin-film transistor T3. The transparent top electrode of the liquid crystal cell is coupled to a reference voltage (e.g., ground potential as shown). The second plate of the storage capacitor $C_s$ and the second plate of the storage capacitor $C^*_s$ are also coupled to a reference potential (e.g., $V_{ref}$ as shown). The gate line $G_n$ is coupled to the control electrode (gate) of the transistor T1. The gate line $G^*_n$ is coupled to the control electrode (gate) of the transistor T4. The control line L is coupled to the control electrode (gate) of the transistor T2. The control line R* is coupled to the control electrode (gate) of the transistor T3. When either one of the storage capacitors $C_s$ and $C^*_s$ is actively coupled to the bottom electrode of the liquid crystal cell, the voltage potential stored thereon provides a voltage difference between the bottom and top pixel electrodes, which controls the orientation of the LC material therebetween. Such control over the orientation of the LC material of the cell provides control over the polarization state of the light emitted therefrom after reflection from the reflecting metal of the bottom pixel electrode and is used as part of a light valve to control the gray level light intensity for the pixel. The active pixel elements and the reflecting bottom electrodes of the pixels are preferably integrated on a silicon substrate. The top electrodes of the pixels are preferably integrated on an opposing transparent glass substrate. Liquid crystal material is disposed between these two substrates to realize the reflective liquid crystal cells of the array.

As shown in the tables of FIGS. 5(B)(i) and 5(B)(ii), during a subset of the display sub-periods (for the architecture of FIG. 2(A)) or during right perspective image display periods (for the architecture of FIG. 2(B)), the gate driver de-activates the control line L (L<='0'), which causes the current path of transistor T2 to be inactive for all pixels of the corresponding array. The inactive current path of transistor T2 isolates the first plate of the storage capacitor $C_s$ from the liquid crystal cell for all pixels of the corresponding array. For a given row n of the array, the gate driver activates the gate line $G_n$ ($G_n$<='1') for the row n, which causes the current path of transistor T1 to be active for the pixels of row n. The active current path of the transistor T1 couples the source line $S_m$ to the first plate of the storage capacitor $C_s$ for the pixels in row n. The column driver presents the desired voltage potential signal onto the source lines of the corresponding array, where it is loaded onto the storage capacitor $C_s$ by the activated current path of transistor T1 for the pixels in row n. The gate driver then de-activates the gate line $G_n$, ($G_n$<='1'), which causes the current path of transistor T1 to be de-activated for the pixels in row n and thus isolates the storage capacitor $C_s$ from the source line $S_m$ for the pixels in row n. In this state, which is referred to as the holding condition or hold state, the storage capacitor $C_s$ stores charge that maintains the application of the desired voltage potential signal on the liquid crystal cell in the subsequent display sub-period (FIG. 2(A)) or in the subsequent left perspective image display period (FIG. 2(B)). This holding condition continues for the duration of the current active display sub-period (FIG. 2(B)) or frame (FIG. 2(A)). These pixel loading and holding operations are repeated for each row of the corresponding array.

Concurrently during the subset of sub-periods (FIG. 2(A)), or concurrently during right perspective image display periods (FIG. 2(B)), the gate driver de-activates the gate lines $G^*_n$ ($G^*_n$<='0') over all of the rows of the corresponding array and activates the control line R* (R*<='1'). The de-activation of the gate lines $G^*_n$ over all of the rows causes the respective current path of transistor T4 to be inactive of all of the pixels of the corresponding array, thereby isolating the first plate of the storage capacitor $C^*_s$ from the source line $S_m$ for all of the pixels of the corresponding array. The activation of the control line R* causes the respective current path of transistor T3 to be active for all of the pixels of the corresponding array. The active current path of transistor T3 couples the storage capacitor $C^*_s$ to the liquid crystal cell for all of the pixels of the corresponding array such that the voltage loaded onto the respective storage capacitors $C^*_s$ in the previous display sub-period (FIG. 2(A)), or in the previous left perspective image display period (FIG. 2(B)), is applied to the corresponding liquid crystal cell for display.

During other display sub-periods (FIG. 2(A)), or during left perspective image display periods (FIG. 2(B)), the gate driver de-activates the control line R* (R*<='0'), which causes the current path of transistor T3 to be inactive for all pixels of the corresponding array. The inactive current path of transistor T3 isolates the first plate of the storage capacitor $C^*_s$ from the liquid crystal cell for all pixels of the corresponding array. For a given row n of the array, the gate driver activates the gate line $G^*_n$ ($G^*_n$<='1') for the row n, which causes the current path of transistor T4 to be active. The active current path of the transistor T4 couples the source line $S_m$ to the first plate of the storage capacitor $C^*_s$. The column driver presents the desired voltage potential signal onto the source lines of the corresponding array, where it is loaded onto the storage capacitor $C^*_s$ by the activated current path of transistor T4 for the pixels in row n. The gate driver then de-activates the gate line $G^*_n$, ($G^*_n$<='1'), which causes the current path of transistor T4 to be de-activated and thus isolates the storage capacitor $C^*_s$ from the source line $S_m$ for the pixels in row n. In this state, which is referred to as the holding condition or hold state, the storage capacitor $C^*_s$ stores charge that maintains the application of the desired voltage potential signal on the liquid crystal cell in the subsequent display sub-period (FIG. 2(A)) or in the subsequent right perspective image display period (FIG. 2(B)). This holding condition continues for the duration of the current display sub-period (FIG. 2(A)) or current frame (FIG. 2(B)). These pixel loading and holding operations are repeated for each row of the corresponding array.

Concurrently during the other display sub-periods (FIG. 2(A)), or concurrently during left perspective image display periods (FIG. 2(B)), the gate driver de-activates the gate lines $G_n$ ($G_n$<='0') over all of the rows of the corresponding array and activates the control line L (L<='1'). The de-activation of the gate lines $G_n$ over all of the rows causes the respective current path of transistor T1 of all of the pixels of the array to be inactive, thereby isolating the first plate of the storage capacitor $C_s$ from the source line $S_m$ for all of the pixels of the array. The activation of the control line L causes the respective current path of transistor T2 to be active for all of the pixels of the array. The active current path of transistor T2 couples the storage capacitor $C_s$ to the liquid crystal cell for all of the pixels of the array such that the voltage loaded onto the respective storage capacitors $C_s$ in the previous display sub-period (FIG. 2(A)) or previous right perspective image display period (FIG. 2(B)) is applied to the corresponding liquid crystal cell for display.

Figure 5C:
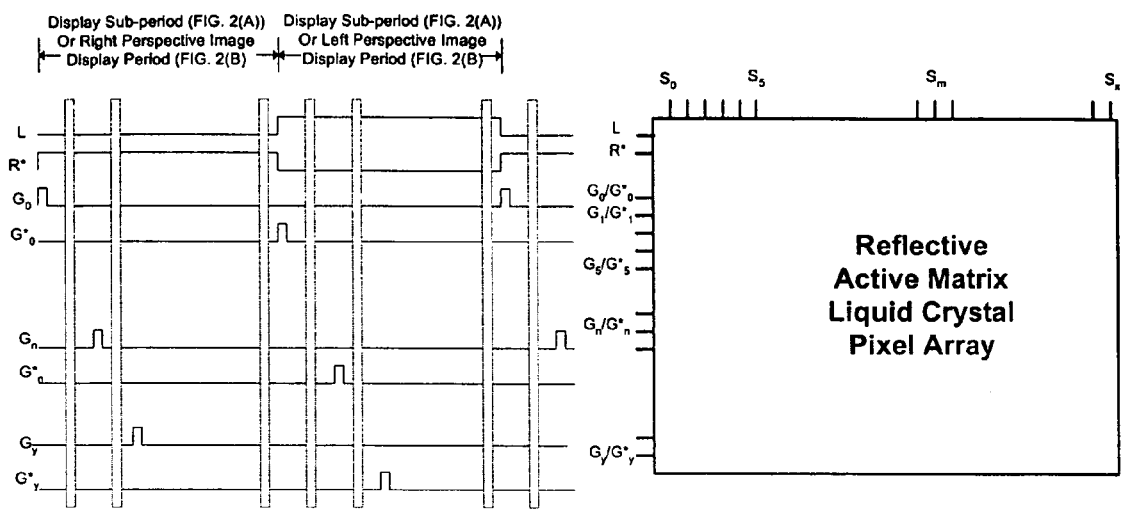
FIG. 5(C) is a schematic diagram that illustrates the operation of the gate drivers of FIGS. 2(A) and 2(B) in activating and de-activating the gate lines and control lines of the reflective pixel array(s) as part of the interleaved loading and display operations of FIGS. 5(B)(i) and 5(B)(ii).

FIG. 5(C) illustrates the operation of the gate driver in activating and deactivating the gate lines and control lines of the corresponding reflective pixel array as part of the interleaved pixel load/hold operations and display operations as described above with respect to FIGS. 5(B)(i) and 5(B)(ii).

Figure 5D:
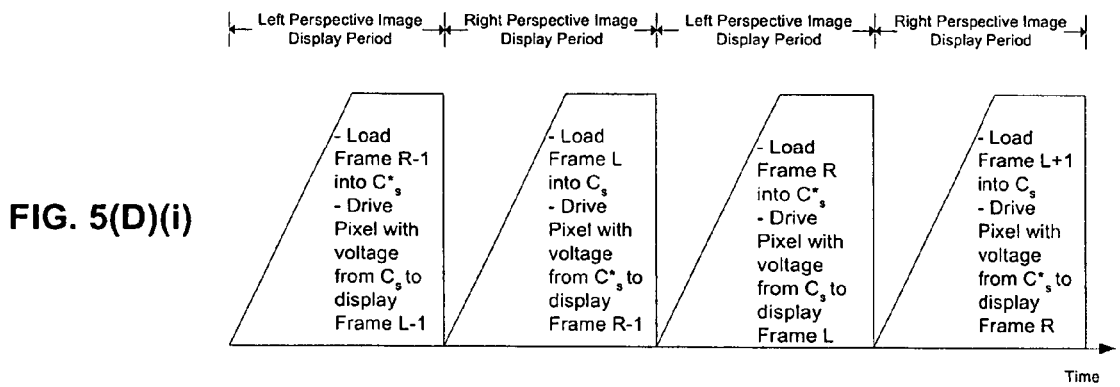
FIGS. 5(D)(i) and (ii) are schematic diagrams that illustrate the temporal relationship of the interleaved loading and display operations of FIG. 5(B) with the operation of shutter glasses, respectively.
Figure 5D:
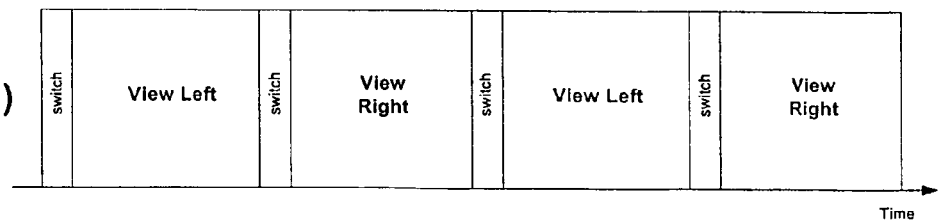

FIGS. 5(D)(i) and (ii) illustrate the temporal relationship of the interleaved pixel load/hold operations and display operations of FIGS. 5(B)(i) and 5(B)(ii) with the operation of shutter glasses, respectively. Such operations provide for improved stereoscopic viewing. As shown in FIG. 5(D)(ii), the shutter glasses are controlled to alternate between a "view left" mode and a "view right" mode. In the "view left" mode, the displayed image passes through the left lens of the glasses to the left eye, but is blocked by the right lens of the glasses. In the "view right" mode, the displayed image passes through the right lens of the glasses to the right eye, but is blocked by the left lens of the glasses. The switching of the glasses between the "view left" mode and the "view right mode", which preferably occurs during the beginning of the respective left and right perspective image display periods as shown, is synchronized to the corresponding left and right perspective image display periods of the display by a synchronization signal communicated from the interface block 18 to the shutter glasses (FIGS. 2(A) and 2(B)). The synchronization signal may be communicated from the interface block 18 to the shutter glasses over a wired or wireless communication link therebetween.

There have been described and illustrated herein several embodiments of a stereoscopic reflective active-matrix liquid crystal display system and methodologies and mechanisms used therein. While particular embodiments of the invention have been described, it is not intended that the invention be limited thereto, as it is intended that the invention be as broad in scope as the art will allow and that the specification be read likewise. Thus, while particular system architectures and particular pixel structures have been disclosed, it will be appreciated that other system architectures and pixel structures can be used as well. In addition, while particular signaling schemes and control schemes have been disclosed, it will be understood that other signaling schemes and control schemes can be used. For example, the front end video processing block and the interface block described above generate and process a frame sequential stereo video signal. Such processing is advantageous because it can operate on traditional (non-stereo) frame sequential video signals to provide for display of such traditional frame sequential video signals (without the use of shutter glasses). One skilled in the art will appreciate that the processing block and interface block can readily be adapted to accommodate other signal formats, including, but not limited to, a dual-channel signal format (i.e., the left and right perspective images communicated in physically separate channels), a single-channel row interleaved signal format (i.e., the left and right perspective images are multiplexed together on alternating rows in each image frame), a single-channel over-under signal format (i.e., the left and right perspective images are added to the top and bottom halves of each image frame), a single-channel side-by-side signal format (i.e., the left and right perspective images are added to the left and rights sides of each image frame), a single-channel column interleaved signal format (i.e., the left and right perspective images are multiplexed together on alternating columns of each image frame), and single-channel dual-frame color multiplexed format (i.e., the left and right perspective images are encoded in two sequential output frames by color multiplexing). It will therefore be appreciated by those skilled in the art that yet other modifications could be made to the provided invention without deviating from its spirit and scope as claimed.

What is claimed is:

1. A display apparatus comprising:
    means for receiving at least one video signal representing a sequence of image pairs including a left perspective image and a right perspective image;
    at least one array of reflective liquid-crystal-based pixels;
    means for deriving a first set of analog voltage signals for the pixels of said at least one array in accordance with corresponding portions of said at least one video signal representing a left perspective image;
    means for clearing a given pixel of said at least one array before loading a corresponding one of said first set of analog voltage signals into the given pixel for display during a left perspective image display period;
    means for deriving a second set of analog voltage signals for the pixels of said at least one array in accordance with corresponding portions of said at least one video signal representing a right perspective image; and
    means for clearing the given pixel of said at least one array before loading a corresponding one of said second analog voltage signals into the given pixel for display during a right perspective image display period.

2. A display apparatus according to claim 1, further comprising:
    first means for clearing all pixels of said at least one array before loading any one of said first set of analog voltage signals into corresponding pixels for display during a left perspective image display period; and
    second means for clearing all pixels of said at least one array before loading any one of said second set of analog voltage signals into corresponding pixels for display during a right perspective image display period.

3. A display apparatus according to claim 2, wherein:
    the array comprises a plurality of gate lines each corresponding to a unique row of pixels and a plurality of source lines each corresponding to a unique column of pixels, each pixel comprising a reflective liquid crystal cell, a storage capacitor electrically coupled to the reflective liquid crystal cell, and a transistor having a control electrode and one of said gate lines electrically coupled thereto for selective activation of a conduction path from one of said source lines to the storage capacitor of the pixel; and
    the first and second means for clearing all pixels of said array comprise column driver circuitry that is adapted to supply voltage potential signals that produce dark pixels to the source lines of said array and gate driver circuitry that activates the gate lines of said array to load the voltage potential signals that produce dark signals from the source lines into the storage capacitors of the pixels of the array.

4. A display apparatus according to claim 3, wherein:
    the gate driver circuitry simultaneously activates all of the gate lines of the array to simultaneously load the voltage potential signals that produce dark signals from the source lines into the storage capacitors of the pixels of the array.

5. A display apparatus according to claim 2, wherein:
the array comprises a plurality of gate lines each corresponding to a unique row of pixels, a plurality of reset lines each corresponding to a unique row of pixels, and a plurality of source lines each corresponding to a unique column of pixels, each pixel comprising a reflective liquid crystal cell, a storage capacitor electrically coupled to the reflective liquid crystal cell, a first transistor having a control electrode and one of said gate lines electrically coupled thereto for selective activation of a conduction path from one of said source lines to the storage capacitor of the pixel, and a second transistor having a control electrode and one of said reset lines electrically coupled thereto for selective activation of a conduction path from the storage capacitor; and
the first and second means for clearing all pixels of said array comprise gate driver circuitry that is adapted to activate the reset lines of the array to thereby discharge the respective storage capacitors of the pixels of the array such that the respective storage capacitors store voltage potential signals that produce dark pixels.

6. A display apparatus according to claim 5, wherein:
the gate driver circuitry simultaneously activates all of the reset lines of the array to thereby discharge the respective storage capacitors of the pixels of the array such that the respective storage capacitors store voltage potential signals that produce dark pixels.

7. A display apparatus according to claim 6, wherein:
the gate driver circuitry is adapted to cycle through the rows of the array to de-activate the reset line for a given row of pixels before loading the given row of pixels with voltage potential signals corresponding thereto for display.

8. A display apparatus according to claim 1, further comprising:
means for communicating a synchronization signal to shutter glasses.

9. A display apparatus according to claim 8, further comprising:
shutter glasses that operate in a left view mode and a right view mode, and that include means for receiving the synchronization signal and using the synchronization signal to synchronize the left and right view modes with the left and right perspective image display periods, respectively.

10. A display apparatus according to claim 1, further comprising:
means for generating the at least one video signal.

11. A display apparatus according to claim 1, wherein:
the at least one video signal comprises a frame sequential stereo video signal.

12. A display apparatus according to claim 1, wherein:
said at least one array comprises a single array of reflective liquid-crystal-based pixels.

13. A display apparatus according to claim 12, further comprising:
an optical subsystem that includes a light source, optical components that project red, green and blue light components onto said array of reflective liquid-crystal-based pixels, and a projection lens which receives modulated light reflected from said array of reflective liquid-crystal-based pixels and projects such modulated light onto a display surface for viewing by at least one observer.

14. A display apparatus according to claim 1, wherein:
said at least one array comprises three arrays of reflective liquid-crystal-based pixels for processing red, green and blue light, respectively.

15. A display apparatus according to claim 14, further comprising:
a light source;
optical components that i) separate the light generated by the light source into individual red, green, blue components, ii) direct the individual red, green and blue components to the corresponding one of said three arrays, and iii) direct the red, green and blue modulated light reflected from said three arrays for output;
an optical combiner which combines the red, green and blue modulated light output by the optical components to form a composite output beam; and
a projection lens which projects the composite output beam generated by the optical combiner onto a display surface for viewing by at least one observer.

16. A display method comprising:
receiving at least one video signal representing a sequence of image pairs including a left perspective image and a right perspective image;
providing at least one array of reflective liquid-crystal-based pixels;
deriving a first set of analog voltage signals for the pixels of said at least one array in accordance with corresponding portions of said at least one video signal representing a left perspective image;
clearing a given pixel of said at least one array before any loading a corresponding one of said first set of analog voltage signals into the given pixel for display during a left perspective image display period;
deriving a second set of analog voltage signals for the pixels of said at least one array in accordance with corresponding portions of said at least one video signal representing a right perspective image; and
clearing the given pixel of said at least one array before loading any one of said second analog voltage signals into the given pixel for display during a right perspective image display period.

17. A display method according to claim 16, further comprising:
clearing all pixels of said at least one array before loading any one of said first set of analog voltage signals into corresponding pixels for display during a left perspective image display period; and
clearing all pixels of said at least one array before loading any one of said second set of analog voltage signals into corresponding pixels for display during a right perspective image display period.

18. A display method according to claim 17, wherein:
the array comprises a plurality of gate lines each corresponding to a unique row of pixels and a plurality of source lines each corresponding to a unique column of pixels, each pixel comprising a reflective liquid crystal cell, a storage capacitor electrically coupled to the reflective liquid crystal cell, and a transistor having a control electrode and one of said gate lines electrically coupled thereto for selective activation of a conduction path from one of said source lines to the storage capacitor of the pixel; and
all pixels of the array are cleared by supplying voltage potential signals that produce dark pixels to the source lines of said array and activating the gate lines of the array to load the voltage potential signals that produce dark signals from the source lines into the storage capacitors of the pixels of the array.

19. A display method according to claim 18, wherein:

all pixels of the array are cleared by simultaneously activating all of the gate lines of the array to simultaneously load the voltage potential signals that produce dark signals from the source lines into the storage capacitors of the pixels of the array.

20. A display method according to claim 17, wherein:

the array comprises a plurality of gate lines each corresponding to a unique row of pixels, a plurality of reset lines each corresponding to a unique row of pixels, and a plurality of source lines each corresponding to a unique column of pixels, each pixel comprising a reflective liquid crystal cell, a storage capacitor electrically coupled to the reflective liquid crystal cell, a first transistor having a control electrode and one of said gate lines electrically coupled thereto for selective activation of a conduction path from one of said source lines to the storage capacitor of the pixel, and a second transistor having a control electrode and one of said reset lines electrically coupled thereto for selective activation of a conduction path from the storage capacitor; and all pixels of the array are cleared by activating the reset lines of the array to thereby discharge the respective storage capacitors of the pixels of the array such that the respective storage capacitors store voltage potential signals that produce dark pixels.

21. A display method according to claim 20, wherein:

all pixels of the array are cleared by simultaneously activating all of the reset lines of the array to thereby discharge the respective storage capacitors of the pixels of the array such that the respective storage capacitors store voltage potential signals that produce dark pixels.

22. A display method according to claim 21, further comprising:

cycling through the rows of the array to de-activate the reset line for a given row of pixels before loading the given row of pixels with voltage potential signals corresponding thereto for display.

23. A display method according to claim 16, further comprising:

communicating a synchronization signal to shutter glasses.

24. A display method according to claim 23, further comprising:

receiving the synchronization signal at the shutter glasses and using the synchronization signal to synchronize left and right view modes with the left and right perspective image display periods, respectively.

25. A display method according to claim 16, further comprising:

generating the at least one video signal.

26. A display method according to claim 16, wherein:

the at least one video signal comprises a frame sequential stereo video signal.

* * * * *